June 4, 1946.  W. D. HERSHBERGER  2,401,423
IMPULSE GENERATOR
Filed Sept. 30, 1937
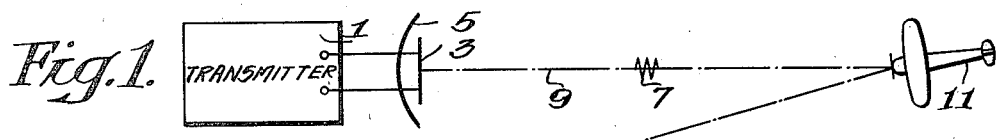
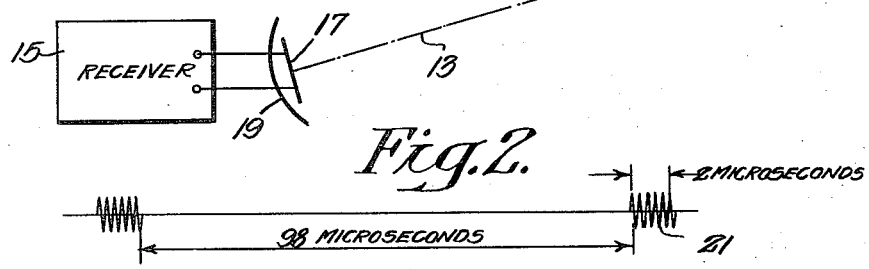
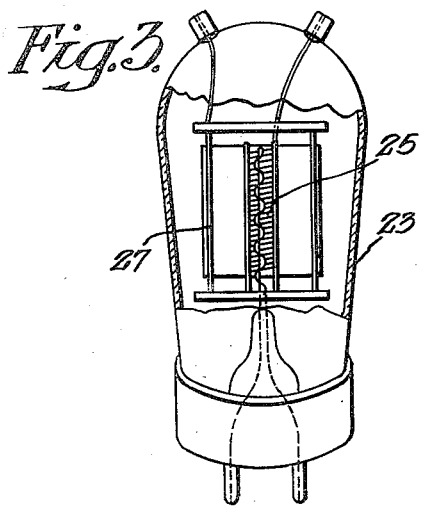
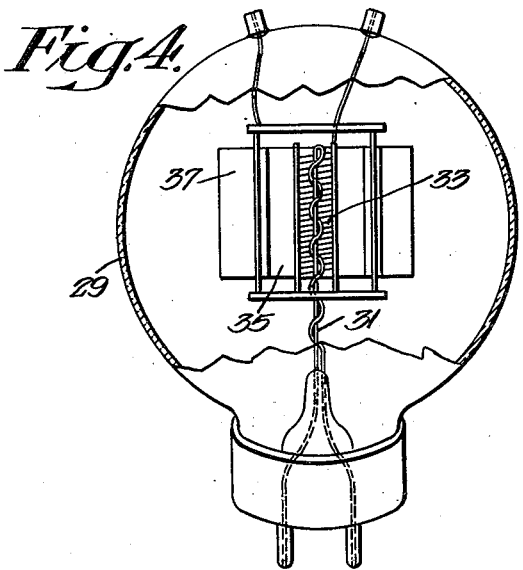
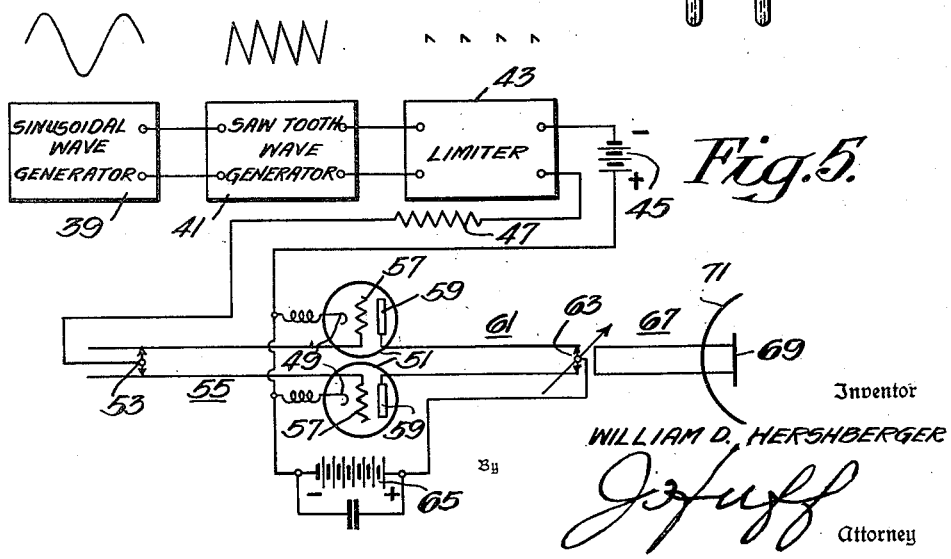
Inventor
WILLIAM D. HERSHBERGER
Attorney Patented June 4, 1946

2,401,423

UNITED STATES PATENT OFFICE 2,401,423

IMPULSE GENERATOR

William D. Hershberger, Collingswood, N. J., assignor to Radio Corporation of America, a corporation of Delaware Application September 30, 1937, Serial No. 166,685

9 Claims. (Cl. 250—27.5)

My invention relates to impulse generators employing thermionic tubes which are used to generate very high frequency oscillations for very short periods. More specifically, my invention relates to the apparatus for and the method of generating impulses for radio echo systems.

In visible objects may be detected by means of radio echoes. An ultra high frequency impulse is transmitted in the form of a beam which is caused to scan the area including an invisible body. The impulse, after striking the body, is reflected. The reflected impulse is picked up by a suitable receiver which may be located near the transmitter. The interval between the transmitted impulse and the received reflected impulse is a measure of the distance the impulse has traveled from the transmitter to the reflecting object and from the reflecting object to the receiver. If the velocity of propagation of the impulse is 186,000 miles per second, and if the transmitter and receiver are near each other, the distance in miles from the transmitter to the reflecting object is equal to $$\frac{186,000}{2} \times T$$

where T is the interval in seconds.

In order that the transmitted impulse shall not interfere with the received impulse, it is necessary that the interval between impulses be long enough to permit the reflected impulse to be received before a second impulse is transmitted. For example, an impulse of 2 microseconds' duration, followed by an interval of 98 microseconds, affords an optimum range from transmitter to reflecting object of approximately 9.1 miles. At greater distances, interference would result.

The range of the transmitter is a function of the power radiated in an impulse. It is difficult to efficiently derive the amounts of power required in the practical application of radio echo systems, which may operate at frequencies of the order of 500 megacycles per second. Each impulse will include a thousand cycles if the frequency is 500 megacycles per second, and the impulse period is 2 microseconds. Not only are the generators of relatively low efficiency at these frequencies, but the apparatus becomes most cumbersome for mobile operation, aircraft, and the like. One of the causes for this inefficiency is the electron transit time within the thermionic tubes.

One of the objects of my invention is to provide means for generating ultra high frequency currents during relatively short and widely spaced intervals.

Another object is to provide means in a thermionic tube whereby the ratio of cathode power and plate-dissipated power greatly exceeds the ratio in conventional tubes.

Another object is to provide means within a thermionic tube whereby ultra high frequency oscillations may be generated more efficiently than heretofore customary.

A still further object is to provide means whereby the frequency range in ultra high frequency oscillators may be increased due to a lowering of the electron transit time.

In describing my invention, reference will be made to the accompanying drawing, in which Figure 1 is a schematic diagram of a radio echo system, Figure 2 is a graphic illustration of the pulse and interval relation in the impulse generator of a radio echo system, Figure 3 is a view partly in section of a conventional thermionic tube, Figure 4 is a view partly in section of a thermionic tube embodied in my invention, and Figure 5 is a schematic circuit diagram of one embodiment of the impulse generator of my invention.

Referring to Fig. 1, an impulse generator or transmitter 1 is connected to a dipole antenna 3 which is located within a reflector 5. The impulse 7 is transmitted in the form of a beam along the line 9 to the object 11 from which the impulse is reflected along line 13 to the receiver 15 which includes a dipole 17 and a reflector 19.

Fig. 2 illustrates diagrammatically an impulse 21 which lasts 2 microseconds. The impulse 21 is followed by an interval of 98 microseconds, and thereafter the impulses of 2 microseconds and intervals of 98 microseconds follow each other. I have found that a conventional thermionic tube operates at relatively low average power output when the useful period of oscillation is but two per cent of the total time, as is the case in radio echo systems. I have also found that the efficiency of thermionic tubes, designed for ultra high frequency oscillations, falls rapidly as the frequency increases due to the fact that electron transit time becomes an appreciable portion of a period.

A convention thermionic tube for generating ultra high frequency oscillations is shown in Fig. 3. By way of example, the tube 23 may have a cathode 25 which consumes 25 watts and an anode 27 which dissipates 50 watts. The rated maximum anode potential is 1250 volts. The oscillatory frequency range does not greatly exceed 200–300 megacycles per second, and at the higher frequencies the efficiency is very low. The foregoing figures are based on continuous operation.

In Fig. 4 I have illustrated a thermionic tube which includes within its evacuated envelope 29 a cathode 31, a grid 33, and an anode 35. The anode 35 preferably includes a number of cooling flanges 37. The envelope 29 is made larger than customary to dissipate larger amounts of heat than has heretofore been customary. The cathode or filament is of a size and of a material which will consume many times the power, and therefore liberate many times the useful emission current, usually required from cathodes, in terms of anode power dissipation.

For tubes using thoriated filament, by way of example, conventional ratios of cathode power to anode-dissipated power are from 1 to 2 to about 1 to 7 and upwards. It should be understood that the emission is proportional to the applied power for a given filament and a given temperature, and while I shall use the term "power applied to the cathode" for convenience, I am concerned with the thermionic emission.

The thermionic tube of my invention uses the reciprocals of these power ratios. By way of example, the cathode power is from 2 to 7 times, and upward, the power dissipation on plate or anode. Thus, in some tubes suitable for use in my invention, I propose to derive fifty times as much instantaneous emission from the cathode as would be normally required for a given average anode current.

Conventional thermionic tubes for ultra high frequency oscillation may have, by way of example, 1000 to 1250 volts applied to the anode. The efficiency of these tubes decreases with increasing frequency so that it becomes necessary to decrease the anode potential. As the anode potential is decreased, the electron transit time increases and this further limits the frequency. Thus the conventional tube becomes limited by low efficiency, and an impassable upper frequency limit.

I propose to apply ten times the anode potential. This will decrease the electron transit time by a factor equal to the square root of ten. The shorter electron transit time will increase the frequency range. Because I shall only apply the anode power for a few per cent of the total time, the anode will be able to dissipate the heat over a relatively long time. The efficiency will be high during the impulse period, and therefore a large amount of energy may be released during the impulse time. Furthermore, since the anode power is only applied for a small percentage of the time, the source may be designed accordingly.

An application of my invention is shown in Fig. 5. A sinusoidal wave generator 39 is connected to a saw-tooth oscillator 41. The output circuit of the saw-tooth generator is connected to a limiter 43. The limiter output circuit includes a biasing battery 45 and a resistor 47 which are connected between the cathodes 49 of thermionic tubes 51 and a movable bridge member 53. The bridge member 53 is slidably connected to the conductors of the transmission line 55 which terminates in the grid electrodes 57 of tubes 51. The anode electrodes 59 are connected to a transmission line 61 which includes a movable bridge member 63. The bridge member is connected to the positive terminal of a B battery 65. The negative terminal of the B battery is joined to the cathodes 49. The cathodes preferably include radio frequency chokes, which may be in the form of resonant lines. The anode resonant line 61 is suitably coupled to a transmission line 67 which terminates in a dipole antenna 69. A reflector 71 may be used to focus the impulses from the dipole on the distant reflecting object.

The operation of the circuit is as follows: The thermionic tubes operate in push-pull as oscillators. Parasitic oscillations are prevented by the series resistor which prevents oscillations at a lower frequency since the tubes are effectively in parallel at low frequencies. The frequency of the desired oscillations is determined by the resonant lines.

The anode current is normally blocked by the high bias voltage applied to the grids. The bias voltage is decreased during the oscillatory impulse period by applying positive impulses to the grids. These positive impulses are derived by generating a current of sinusoidal wave form and of the desired frequency. The sinusoidal currents are applied to control the frequency of the saw-tooth generator which establishes currents of a saw-tooth wave form. The saw-tooth currents are applied to a limiter, which only passes the positive peaks of the saw-tooth current. Since the saw-tooth peaks may be made very sharp, the periods of the impulses may be made short and the intervals between impulses long.

Thus I have described an impulse generator which includes a thermionic tube of novel characteristics. The tube is characterized by a thermionic emission which is many times greater than previously used in tubes of equivalent anode power dissipation. The electron transit time has been greatly shortened by applying high voltages to the anode for short periods, followed by relatively large time intervals. While I have described the impulse generator in connection with a radio echo system, it should be understood that my invention may be applied to telegraphic, telephonic, or directional finding systems.

I claim as my invention:

1. A thermionic tube of the type wherein the variable output current thereof includes sharp peaks of which the time duration per interval does not exceed ten per cent of the period of said interval, said tubing including grid, anode and cathode electrodes therein, said anode having a normal anode current rating, and said cathode having an electron emissive capacity of the order of ten times that required to attain said normal anode current rating.

2. A thermionic tube of the type wherein the variable output current thereof includes sharp peaks of which the time duration per interval does not exceed ten per cent of the period of said interval, said tube including at least anode and cathode electrodes therein, the effective surface of said anode having a normal anode current rating, and the effective surface of said cathode having an electron emissive capacity of the order of ten times that required to attain said normal anode current rating.

3. A thermionic tube of the type wherein the variable output current thereof includes sharp peaks of which the time duration per interval does not exceed ten per cent of the period of said interval, said tube including at least anode and cathode electrodes therein, said anode having a normal continuous anode current rating, and said cathode having a continuous electron emissive capacity of at least ten times that required to attain said normal continuous anode current rating.

4. A thermionic tube of the type wherein the variable output current thereof includes sharp peaks of which the time duration per interval does not exceed ten per cent of the period of said interval, said tube including at least anode and cathode electrodes therein, said anode having a normal anode current rating based upon continuous operation with a normal cathode, and said cathode capable of continuous electron emission of at least ten times that required to attain said normal anode current rating.

5. A thermionic tube of the type wherein the variable output current thereof includes sharp peaks of which the time duration per interval does not exceed ten per cent of the period of said interval, said tube including at least anode and cathode electrodes therein, said anode having a normal anode current rating based upon continuous operation with a normal cathode, and said cathode capable of continuous electron emission of from ten to fifty times that required to attain said normal anode current rating.

6. A thermionic tube of the type wherein the variable output current thereof includes sharp peaks of which the time duration per interval does not exceed ten per cent of the period of said interval, said tube including grid, anode and cathode electrodes therein, said anode having a predetermined anode current rating, and said cathode having an electron emissive capacity of the order of ten times that required to attain said predetermined anode current rating.

7. A thermionic tube of the type wherein the variable output current thereof includes sharp peaks of which the time duration per interval does not exceed ten per cent of the period of said interval, said tube including at least anode and cathode electrodes therein, said anode having a predetermined continuous anode current rating and an intermittent peak current rating of the order of ten times said predetermined current rating, and said cathode having an electron emissive capacity of the order of that required to attain said peak current rating.

8. In a thermionic tube having grid, anode and cathode electrodes therein, said anode having a normal anode current rating, said cathode having an electron emissive capacity of the order of ten times that required to attain said normal anode current rating, the method comprising impressing periodic potentials to said grid, wherein said periodic potentials comprise a peak value and a comparatively low value per period, said low value extending during at least ninety per cent of said period, and deriving from said anode peak currents exceeding said normal anode current rating by a ratio of the order of at least ten to one.

9. In a thermionic tube having grid, anode and cathode electrodes therein, said anode having a normal anode current rating, said cathode having an electron emissive capacity of the order of ten times that required to attain said normal anode current rating, the method comprising impressing periodic potentials to said grid, wherein said periodic potentials comprise a peak value and a substantially zero value per period, said zero value extending during at least ninety per cent of said period, and deriving from said anode peak currents exceeding said normal anode current rating by a ratio of the order of at least ten to one.

WILLIAM D. HERSHBERGER.